United States Patent [19]
Childs

[11] Patent Number: 5,621,337

[45] Date of Patent: Apr. 15, 1997

[54] ITERATIVE LOGIC CIRCUIT

[75] Inventor: Matthew H. Childs, Arlington, Tex.

[73] Assignee: National Semiconductor Corporation, Santa Clara, Calif.

[21] Appl. No.: 521,348

[22] Filed: Aug. 30, 1995

[51] Int. Cl.$^6$ .......................... H03K 19/00; H03K 19/173
[52] U.S. Cl. .................. 326/46; 326/37; 326/93; 365/219
[58] Field of Search ................ 326/104, 46, 37, 326/40, 93; 327/298, 172; 365/219, 221

[56] References Cited

U.S. PATENT DOCUMENTS

| | | | |
|---|---|---|---|
| 4,399,377 | 8/1983 | Jones | 326/46 |
| 4,415,818 | 11/1983 | Ogawa et al. | 326/46 |
| 4,786,829 | 11/1988 | Letcher | 326/46 |
| 4,945,518 | 7/1990 | Muramatsu | 365/219 |
| 5,493,239 | 2/1996 | Zlotnick | 326/40 |

OTHER PUBLICATIONS

Wakerly, John. *Digital Design Principles and Practices.* Prentice Hall. 1989. pp. 474–477.

Primary Examiner—Edward P. Westin
Assistant Examiner—Jon Santamauro
Attorney, Agent, or Firm—Limbach & Limbach L.L.P.

[57] ABSTRACT

An iterative logic circuit for iteratively performing a logic function includes a two-input logic gate and a D-type flip-flop. The flip-flop receives and time-delays the output signal from the logic gate to provide a feedback signal as one of the input signals to the logic gate. By sequentially processing the feedback signal together with a serial input data signal, the logic gate iteratively performs an associative logic function (e.g. EXCLUSIVE-OR) upon the serial input data signal, thereby performing a parallel logic function by executing a serial logic operation.

34 Claims, 2 Drawing Sheets

5,621,337

ITERATIVE LOGIC CIRCUIT

BACKGROUND OF THE INVENTION

1. Field of the Invention

The present invention relates to logic circuits for performing a parallel logic function by executing a serial logic operation, and in particular, to such logic circuits which perform iterative logic functions.

2. Description of the Related Art

A number of digital logic processes require a parallel processing of multiple logic signals. One example of such a process is "hashing" whereby long, and sometimes variable length, streams of data are transformed into shorter versions thereof. One such common parallel logic operation in hashing is that of performing an EXCLUSIVE-OR function upon multiple parallel signals. Conventionally, this has been done by using a logic gate with multiple parallel inputs or, alternatively, multiple logic gates which are cascaded and have fewer inputs per gate. A problem with such an approach, however, is that a significant amount of circuitry is required. As a result, and of particular concern with respect to integrated circuit implementations, such circuitry often becomes quite large and cumbersome, and uses a significant amount of power.

Accordingly, it would be desirable to have a technique by which parallel logic operations could be performed with significantly less circuit area, thereby reducing the amount of area and power required.

SUMMARY OF THE INVENTION

An iterative logic circuit for iteratively performing a logic function in accordance with the present invention advantageously provides for the scaling of the circuitry required for performing associative logic functions. By performing such functions iteratively significantly less circuitry is required, thereby resulting in smaller circuit space and power requirements.

An apparatus including an iterative logic circuit for iteratively performing a logic function in accordance with one embodiment of the present invention includes a logic circuit for receiving and sequentially processing input logic signals and in accordance therewith providing a processed logic signal, and a feedback circuit for receiving the processed logic signal and a timing signal and in accordance therewith providing one of the input logic signals to the logic circuit. Another one of the input logic signals includes a number of sequential data bits, and the sequential processing of the input logic signals by the logic circuit along with the providing of one of the input logic signals by the feedback circuit together form an iterative performance of a logic function upon the sequential data bits of the other input logic signal.

An apparatus including a parallel/serial logic circuit for performing a parallel logic function by iteratively executing a serial logic operation upon a plurality of data signals in accordance with another embodiment of the present invention includes an input circuit for receiving parallel data signals and in accordance therewith providing a number of input data signals, and a logic circuit for performing a parallel logic function by executing a serial logic operation upon the input data signals. In one embodiment hereof, the logic circuit includes a logic gate for receiving and sequentially processing the input data signals together with a feedback signal and in accordance therewith providing a processed logic signal, and a feedback circuit for receiving the processed logic signal and a timing signal and in accordance therewith providing the feedback signal.

These and other features and advantages of the present invention will be understood upon consideration of the following detailed description of the invention and the accompanying drawings.

DETAILED DESCRIPTION OF THE INVENTION

Figure 1:
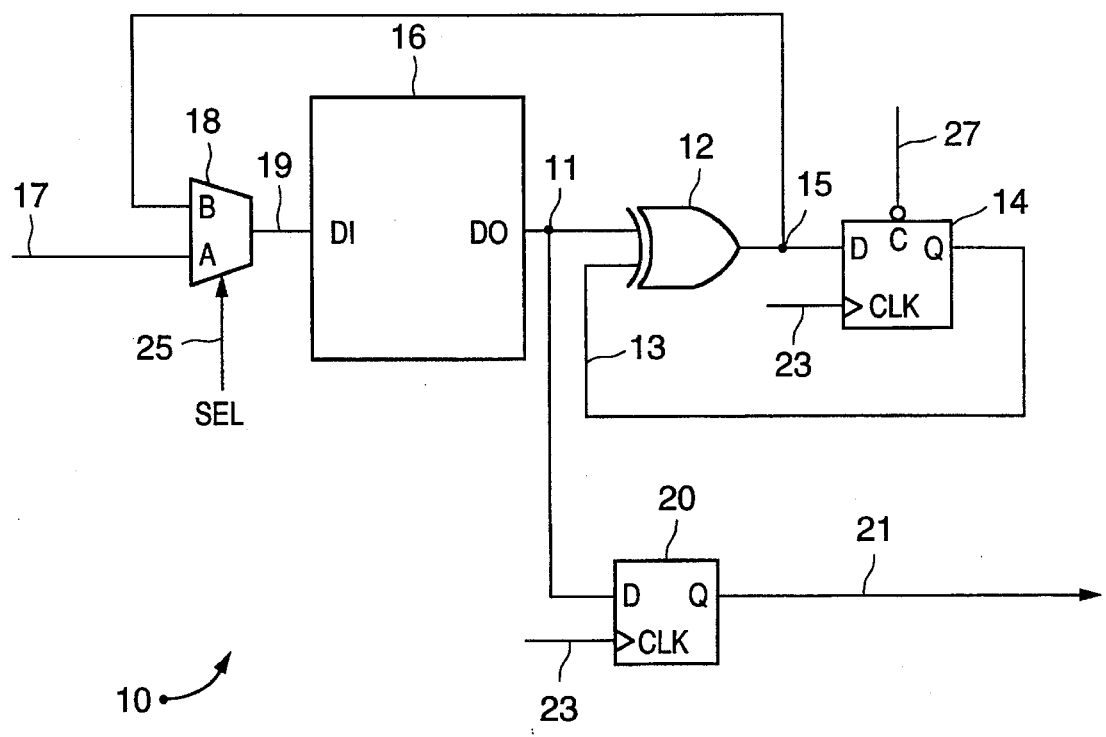
FIG. 1 is a schematic diagram of an iterative logic circuit in accordance with one embodiment of the present invention.

Referring to FIG. 1, an iterative logic circuit 10 in accordance with one embodiment of the present invention includes a processing circuit formed by an EXCLUSIVE-OR gate 12 and a D-type flip-flop 14, plus a memory circuit 16, a multiplexor 18 and a D-type flip-flop 20, all interconnected substantially as shown. The logic gate 12 receives a sequential series of data bits 11 from the memory circuit 16 and a feedback signal 13 from the Q-output of the flip-flop 14 and processes such signals 11, 13 in accordance with the associative EXCLUSIVE-OR function. The resulting processed logic signal 15 is inputted to the flip-flop 14 in accordance with a timing, or clock, signal 23. (The flip-flop 14 is initially cleared in accordance with an active low clear signal 27.)

The serial data bits 11 received from the memory circuit 16 are initially inputted therein by way of the multiplexor 18. An input signal 17 containing such digital information is selected by the multiplexor 18 in accordance with a select control signal 25. This selected signal 19 is then inputted into the memory circuit 16 in accordance with principles well known in the art. The processed logic signal 15 from the logic gate 12 is fed back as a second input to the multiplexor 18. This allows the results of the previously processed data to be fed back, via the memory circuit 16, to be further iteratively processed as the input signal 11 to the logic gate 12. After some predetermined number of data bits have been iteratively processed in this manner, the output 11 from the memory circuit 16 is clocked into the output flip-flop 20 in accordance with the clock signal 23. The latched output signal 21 can then be used as desired for further processing elsewhere.

It should be appreciated that the input signal 17 to the multiplexor 18 and, therefore, the selected input signal 19 to the memory circuit 16 can consist of multiple parallel input signals, with the A-input of the multiplexor 18 and data input DI of the memory circuit 16 being parallel signal ports. The memory circuit 16 can then be used to perform a parallel-to-serial data conversion to provide the serial input signal 11 to the logic gate 12. Further alternatively, a parallel-to-serial data converter in the form of a shift register (not shown) can be used to convert multiple parallel input signals to a serial data bitstream for the input signal 17 to the multiplexor 18.

Figure 2:
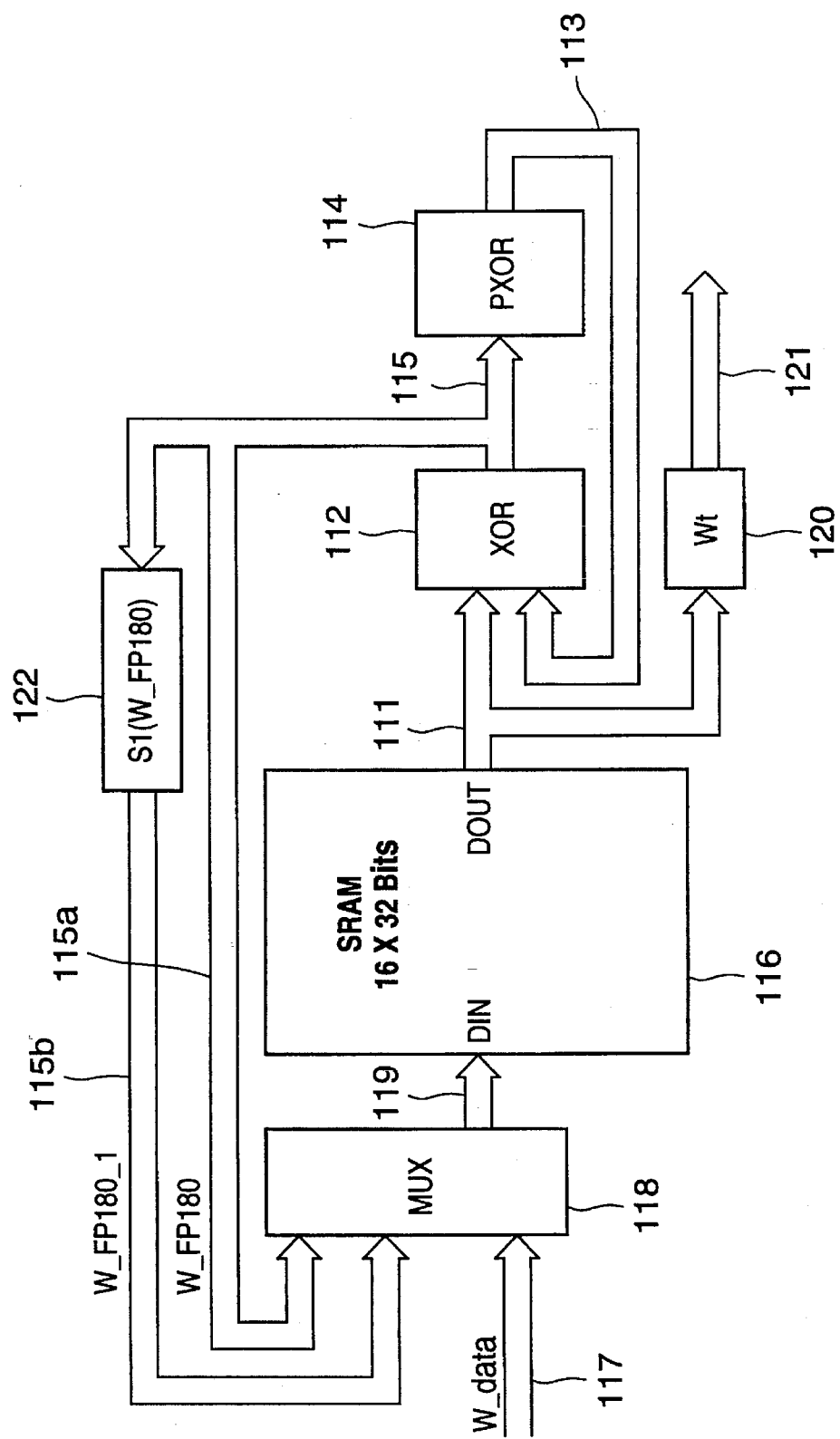
FIG. 2 is a schematic diagram of an iterative logic circuit in accordance with another embodiment of the present invention.

Referring to FIG. 2, an iterative logic circuit 110 in accordance with another embodiment of the present invention performs a number of parallel logic functions simultaneously by iteratively executing a number of serial logic functions simultaneously. This iterative logic circuit 110 includes a processing circuit formed by a group 112 of EXCLUSIVE-OR logic gates and a group 114 of associated data registers (e.g. D-type flip-flops), plus a memory circuit 116 (16×32-bit static random access memory), a 3:1 multiplexor 118, a group 120 of output data registers (e.g. D-type flip-flops) and a feedback delay circuit 122 (e.g. a group of shift registers), all interconnected substantially as shown.

Similar to the iterative logic circuit 10 of FIG. 1, the group 112 of logic gates receives a parallel group 111 of sequential series of data bits from the memory circuit 116 and a parallel group 113 of feedback signals from the outputs of the group 114 of data registers and processes such signals 111, 113 in accordance with the associative EXCLUSIVE-OR function. The resulting parallel group 115 of processed logic signals is synchronously inputted to the group 114 of data registers.

The data bits 111 received from the memory circuit 116 are initially inputted therein by way of the multiplexor 118, which selects one of three input signals: a group 117 of parallel input data signals; a non-delayed group 115a of feedback signals from the outputs of the logic gates 112; and a time-delayed group 115b of feedback signals also from the outputs of the logic gates 112 but delayed in time. The latter group 115b of feedback signals can be selectively and synchronously delayed in time by appropriate use of shift registers for the feedback delay circuit 122. As discussed above, this allows the results of previously processed data to be fed back, via the memory circuit 116, to be further iteratively processed as the input signal 111 to the logic gate 112. After a predetermined number of data bits have been processed in this manner, the output 111 from the memory circuit 116 is clocked into the output data registers 120 to make the latched output signals 121 available for use elsewhere.

This particular iterative logic circuit 110 was designed for generating "W-data" used in the execution of a data hashing algorithm in accordance with Secure Hash Standards FP180 and FP180-1 as established by the National Institute of Standards and Technology (with the various parallel signals being 32 bits wide). Accordingly, the feedback signals FP180 (115a) and FP180-1 (115b) and action of the iterative logic circuit 110 are defined as follows:

Secure Hashing Algorithm Standards FIPS 180 & 180-1

FP180: $W[t+16]=W[t+13] \text{ XOR } W[t+8] \text{ XOR } W[t+2] \text{ XOR } W[t]$ FP180-1: $W[t+16]=S1 (W[t+13] \text{ XOR } W[t+8] \text{ XOR } W[t+2] \text{ XOR } W[t])$ (where $S1(X)=X$ left-rotated by one bit)

Secure Hashing Algorithm W-Generator Action

| Clock | Action |
|---|---|
| 0 | Clear PXOR ("partial" XOR registers) |
|   | Read W[t+2] |
| 1 | Load W[t+2]into PXOR |
|   | Read W[t] |
| 2 | Load W[t] into Wt register |
|   | Load (W[t+2] XOR W[t]) into PXOR |
|   | Read W[t+8] |
| 3 | Load (W[t+2] XOR W[t] XOR W[t+8]) into PXOR |
|   | Read W[t+13] |
| 4 | Write W[t+16]over original W[t] |

The invention embodiments described herein have been implemented for use in conjunction with another invention which is disclosed in co-pending, commonly assigned U.S. patent application Ser. No. 08/521,598, entitled "Methods And Apparatuses For Using Random Access Memory In Hardware Based Hashing Algorithms Requiring Expansion Functions", the disclosure of which is incorporated herein by reference.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an iterative logic circuit for iteratively performing a logic function, said iterative logic circuit comprising:

a logic circuit for receiving and sequentially processing a plurality of sequential input logic signals and in accordance therewith providing a plurality of sequential processed logic signals;

a feedback circuit, coupled to said logic circuit, for receiving said plurality of sequential processed logic signals and a timing signal and in accordance therewith providing a first one of said plurality of sequential input logic signals; and a storage circuit, coupled to said logic circuit, for receiving and storing said plurality of sequential processed logic signals and in accordance therewith providing a portion of a second one of said plurality of sequential input logic signals;

wherein said second one of said plurality of sequential input logic signals comprises a plurality of sequential data bits, and wherein each one of a portion of said plurality of sequential data bits corresponds to a respective one of said plurality of sequential processed logic signals, and further wherein said sequential processing of said plurality of input logic signals and said providing of said first one of said plurality of input logic signals together form an iterative performance of a logic function upon said second one of said plurality of input logic signals.

2. The apparatus of claim 1, wherein said logic circuit is for performing an associative logic function.

3. The apparatus of claim 1, wherein said logic circuit comprises an EXCLUSIVE-OR circuit.

4. The apparatus of claim 1, wherein said logic circuit is asynchronous and said feedback circuit is synchronous.

5. The apparatus of claim 1, wherein said feedback circuit comprises a time-delay circuit.

6. The apparatus of claim 1, wherein said feedback circuit comprises a clearable memory circuit.

7. The apparatus of claim 1, wherein said storage circuit comprises:

a signal selector for receiving a control signal and in accordance therewith receiving and selecting between a plurality of input data signals including said plurality of sequential processed logic signals and in accordance therewith providing a plurality of data; and a memory circuit, coupled to said signal selector, for receiving and storing said plurality of data and in accordance therewith providing said second one of said plurality of sequential input logic signals.

8. An apparatus including a parallel/serial logic circuit for performing a parallel logic function by iteratively executing a serial logic operation upon a plurality of data signals, said parallel/serial logic circuit comprising:

an input circuit for receiving a plurality of parallel data signals including a processed logic signal and in accordance therewith providing a plurality of input data signals; and a logic circuit, coupled to said input circuit, for performing a parallel logic function by iteratively executing a serial logic operation upon said plurality of input data signals and in accordance therewith providing said processed logic signal.

9. The apparatus of claim 8, wherein said input circuit comprises a parallel-to-serial data converter.

10. The apparatus of claim 9, wherein said input circuit comprises a shift register.

11. The apparatus of claim 9, wherein said input circuit comprises a memory circuit.

12. The apparatus of claim 8, wherein said logic circuit is for performing an associative logic function.

13. The apparatus of claim 8, wherein said logic circuit comprises an EXCLUSIVE-OR circuit.

14. The apparatus of claim 8, wherein said logic circuit comprises:

a logic gate for receiving and sequentially processing said plurality of input data signals together with a feedback signal and in accordance therewith providing said processed logic signal; and a feedback circuit, coupled to said logic gate, for receiving said processed logic signal and a timing signal and in accordance therewith providing said feedback signal.

15. The apparatus of claim 14, wherein said logic gate comprises an EXCLUSIVE-OR gate.

16. The apparatus of claim 14, wherein said feedback circuit comprises a time-delay circuit.

17. The apparatus of claim 14, wherein said feedback circuit comprises a clearable memory circuit.

18. A method of iteratively performing a logic function, said method comprising the steps of:

receiving and sequentially processing a plurality of sequential input logic signals and in accordance therewith generating a plurality of sequential processed logic signals;

receiving said plurality of sequential processed logic signals and a timing signal and in accordance therewith generating a first one of said plurality of sequential input logic signals; and receiving and storing said plurality of sequential processed logic signals and in accordance therewith generating a portion of a second one of said plurality of sequential input logic signals;

wherein said second one of said plurality of sequential input logic signals comprises a plurality of sequential data bits, and wherein each one of a portion of said plurality of sequential data bits corresponds to a respective one of said plurality of sequential processed logic signals, and further wherein said sequential processing of said plurality of input logic signals and said providing of said first one of said plurality of input logic signals together form an iterative performance of a logic function upon said second one of said plurality of input logic signals.

19. The method of claim 18, wherein said step of receiving and sequentially processing a plurality of input logic signals and in accordance therewith generating a processed logic signal comprises performing an associative logic function.

20. The method of claim 18, wherein said step of receiving and sequentially processing a plurality of input logic signals and in accordance therewith generating a processed logic signal comprises performing an EXCLUSIVE-OR logic function.

21. The method of claim 18, wherein said step of receiving and sequentially processing a plurality of input logic signals and in accordance therewith generating a processed logic signal is asynchronous and said step of receiving said processed logic signal and a timing signal and in accordance therewith generating a first one of said plurality of input logic signals is synchronous.

22. The method of claim 18, wherein said step of receiving said processed logic signal and a timing signal and in accordance therewith generating a first one of said plurality of input logic signals comprises time-delaying said processed logic signal in accordance with said timing signal.

23. The method of claim 18, wherein said step of receiving said processed logic signal and a timing signal and in accordance therewith generating a first one of said plurality of input logic signals comprises storing and outputting said processed logic signal with a clearable memory circuit.

24. The method of claim 18, wherein said step of receiving and storing said plurality of sequential processed logic signals and in accordance therewith generating a portion of a second one of said plurality of sequential input logic signals comprises:

receiving a control signal and in accordance therewith receiving and selecting between a plurality of input data signals including said plurality of sequential processed logic signals and in accordance therewith generating a plurality of data; and storing said plurality of data and in accordance therewith generating said second one of said plurality of sequential input logic signals including said portion thereof.

25. A method of performing a parallel logic function by iteratively executing a serial logic operation upon a plurality of data signals, said method comprising the steps of:

receiving a plurality of parallel data signals including a processed logic signal and in accordance therewith generating a plurality of input data signals; and performing a parallel logic function by iteratively executing a serial logic operation upon said plurality of input data signals and in accordance therewith generating said processed logic signal.

26. The method of claim 25, wherein said step of receiving a plurality of parallel data signals and in accordance therewith generating a plurality of input data signals comprises receiving said plurality of parallel data signals and in accordance therewith generating a plurality of serial data signals.

27. The method of claim 26, wherein said step of receiving said plurality of parallel data signals and in accordance therewith generating a plurality of serial data signals comprises receiving said plurality of parallel data signals and in accordance therewith generating said plurality of serial data signals with a shift register.

28. The method of claim 26, wherein said step of receiving said plurality of parallel data signals and in accordance therewith generating a plurality of serial data signals comprises receiving said plurality of parallel data signals and in accordance therewith generating said plurality of serial data signals with a memory circuit.

29. The method of claim 25, wherein said step of performing a parallel logic function by iteratively executing a serial logic operation upon said plurality of input data signals comprises performing an associative logic function.

30. The method of claim 25, wherein said step of performing a parallel logic function by iteratively executing a serial logic operation upon said plurality of input data signals comprises performing an EXCLUSIVE-OR function.

31. The method of claim 25, wherein said step of performing a parallel logic function by iteratively executing a serial logic operation upon said plurality of input data signals and in accordance therewith generating said processed logic signal comprises:

receiving and sequentially processing said plurality of input data signals together with a feedback signal and in accordance therewith generating said processed logic signal; and receiving said processed logic signal and a timing signal and in accordance therewith generating said feedback signal.

32. The method of claim 31, wherein said step of receiving and sequentially processing said plurality of input data signals together with a feedback signal and in accordance therewith generating a processed logic signal comprises performing an EXCLUSIVE-OR function upon said plurality of input data signals and said feedback signal.

33. The method of claim 31, wherein said step of receiving said processed logic signal and a timing signal and in accordance therewith generating said feedback signal comprises time-delaying said processed logic signal.

34. The method of claim 31, wherein said step of receiving said processed logic signal and a timing signal and in accordance therewith generating said feedback signal comprises storing and outputting said processed logic signal with a clearable memory circuit.

\* \* \* \* \*